United States Patent Office 3,297,710
Patented Jan. 10, 1967

3,297,710
OXOARYLIDENE-IMIDAZOLES
Ernest Frank Silversmith, Wilmington, Del., assignor to
E. I. du Pont de Nemours and Company, Wilmington,
Del., a corporation of Delaware
No Drawing. Filed Mar. 10, 1964, Ser. No. 350,637
9 Claims. (Cl. 260—309)

This application is a continuation in part of my copending application Serial No. 271,613, filed April 9, 1963, now abandoned.

This invention is directed to novel imidazole compounds and more particularly to selected oxo-arylidene-imidazoles.

It is an object of this invention to provide new colored compounds which are useful as dyes. It is a further object to provide a novel class of compounds adapted for coloring textiles or papers.

These and other objects of the present invention will become apparent in the following description and claims.

The novel oxo-arylideneimidazoles of this invention have the formulas

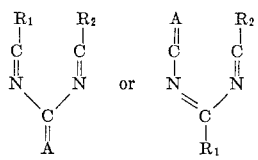

and may be generically defined as having the formula

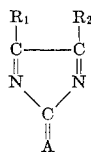

said radicals $R_1$ and A are interchangeable to give the corresponding oxo-arylidene-imidazole wherein A is X-oxo (XH) arylidene, X designating a position in the arylidene so chosen that the oxo atom is conjugated with the imidazolyl group, wherein $R_1$ and $R_2$ stand for H, alkyl or aryl, and wherein at least one hydrogen atom of said imidazoles may be replaced by a substituent having a Hammett sigma value in the range $-1.0$ to $1.0$ relative to a sigma value of $0.0$ for said replaced hydrogen. Preferably, the sigma value is of the range $-0.60$ to $0.90$.

$R_1$ and $R_2$ may be H, alkyl, aryl, or such group containing one or more substituents which are electronically compatible with the oxo-arylidene-imidazole chromophore, said substituents being defined as above in terms of Hammett sigma values which characterize the ability of the substituents to attract or repel electrons relative to the effect of hydrogen as the substituent. The alkyl and aryl radicals may vary widely and include those containing up to 18 carbon atoms. More particularly, alkyls of from 1–5 carbons (i.e., lower alkyls) ranging from methyl through amyl, including branched as well as straight chain structures, are preferred for reasons of availability. Normally aryl will be an aromatic hydrocarbon radical. The aryls include polycarbocycles and polyphenyls, exemplified by naphthyl, anthryl and phenanthryl, biphenyl and terphenyl, in addition to phenyl which is preferred.

This invention is based on the discovery of novel oxo-arylidene-imidazole chromophores having the following basic structural formulas

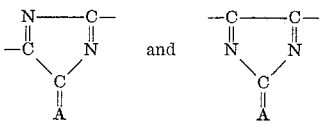

where A is as defined above. The two free valencies shown in each of the above formulas are satisfied in the novel colored compounds of this invention by radicals (i.e., $R_1$ and $R_2$ as heretofore described) which, as defined above, are electronically compatible with the chromophoric units, that is, they do not destroy the ability of the oxo-arylidene-imidazolyl system to impart color to the molecule as a whole.

The novel compounds are normally crystalline solids which, in general, are soluble in organic solvents and insoluble in water. They range in shade from yellow to blue, including orange, red, purple, and green, and as a class are suitable as pigments and dyes. They may be employed singly or in combinations to provide a variety of shades and tones. Some are particularly suitable as pH indicators in that their colorations depend on the pH of the surrounding medium.

In particular embodiments, "A" of the basic structural formula contains from 6 to 14 nuclear carbon atoms, as in phenylidene, naphthylidene, phenanthrylidene, and anthrylidene; preferably, "A" is a phenylidene or naphthylidene radical wherein (1) the oxo group is conjugated with the imidazole system via the 2- or 4-position of said A radical and (2) substituents other than hydrogen when present have Hammett sigma values in the range $-0.4$ to $0.4$ and particularly are alkyl, halogen, or alkoxyl groups.

The substituents, which may replace one or more hydrogens of the alkyl and aryl radicals, may also vary widely and include electropositive (electron-repelling) as well as electronegative (electron-attracting) groups within the defined limits. The sigma value characterizes the ability of a substituent to repel or attract electrons. Substituents with negative values repel, those with positive values attract electrons, relative to hydrogen whose sigma value is zero by definition. The derivation and interpretation of these values are discussed in Hammett, Physical Organic Chemistry, 1st ed., pp. 186–205, McGraw-Hill Book Co., 1940; Hine, Physical Organic Chemistry, 1st ed., pp. 69–80, 1956, also published by the McGraw-Hill Book Co., Newman, Steric Effects in Organic Chemistry, John Wiley & Sons, 1956, Chapter 13, by Taft, particularly at pages 570–595; Jaffe, Chem. Rev., 53, 191 (1953), particularly at pages 219–233.

The sigma values used herein are those listed in Table 7 of the Jaffe reference, heretofore identified, the largest negative or positive value being taken on the basis that it represents the maximum electron-repelling or attracting effect of the substituent. Representative substituents and their sigma values (relative to $H=0.00$) are: methyl ($-0.17$), ethyl ($-0.15$), t-butyl ($-0.20$), phenyl (0.22), styryl (0.62); trifluoromethyl (0.55), chloromethyl (0.18), cyanomethyl (0.01), 2-carboxyethyl ($-0.07$); hydroxy ($-0.36$), butoxy ($-0.32$), phenoxy ($-0.03$); dimethylamino ($-0.60$), trimethylammonio, i.e., $Me_3N+$ (0.90); fluoro (0.34), chloro (0.37), bromo (0.39), iodo (0.35); methylthio ($-0.05$), methylsulfonyl (1.05); carboxyl (0.73), methoxycarbonyl (0.64); acetyl (0.87), cyano (1.00).

It will be understood that the sigma values as used herein characterize substituent groups in substituted alkyl as well as aryl radicals. Such substituents, on $R_1$ and $R_2$ for example, normally exert their greatest electronic (e.g., color-influencing) effects on the chromphoric system when attached to unsaturated (aryl) radicals, particularly when in conjugated relationship with the oxo-arylidene-imidazole chromophore. The effect of substituent is generally smaller when it is insulated from the chromophoric unit by a saturated carbon atom, as when the substituent is attached to an alkyl radical. As indicated by the sigma values, all alkyl groups have substantially similar electronic effects, so that replacing a hydrogen of $R_1$ or $R_2$, where these are alkyl, by an alkyl substituent is of little consequence. Similarly replacing a hydrogen of a phenyl radical by phenyl results in still another aryl radical having a comparable electronic effect. Further it should be apparent that alkyl radicals may bear aryl substituents and that conversely aryl radicals may carry alkyl substituents, similarly other hydrocarbonoxy substituents such as aralkoxy and alkaroxy can replace butoxy and phenoxy of the above representative substituents for substantially comparable effects.

Thus, it is understood that the substituents, as heretofore characterized, may be halogen, hydroxyl, cyano, alkyl, haloalkyl, cyanoalkyl, hydroxyalkyl, aminoalkyl, aryl, alkoxyl, aroxyl, aralkoxyl, alkylthio, arylthio, aralkylthio, alkanoyl, aroyl, alkyl, sulfonyl, arylsulfonyl, dialkylamino, trialkyl ammonio, alkoxycarbonyl, aryloxycarbonyl, and dialkylaminocarbonyl. Preferably, alkyl and alk stand for the $C_1$–$C_5$ radicals, and aryl and ar stand for aromatic hydrocarbon radicals, e.g., phenyl. Each of these substituent groups is electronically compatible with the heretofore described chromophoric units of this invention. When the substituent is a positively charged trialkyl ammonio group, that is, the oxo-arylidene-imidazole is a quaternary ammonium compound, it will be understood that the positively charged group will be associated with a salt-forming anion such as alkylsulfate, sulfate, chloride, bromide, iodide, etc.

Representative imidazoles which fall with the scope of the heretofore defined, novel structure are given in the following table. In the table, the imidazole substituent groups in the 2, 4, and 5 positions, in the preceding invention formulas, are listed under the respective position headings. It will be understood that the parent compound in each instance is an imidazole. More particularly, when the substituent in the 2-position is an oxo-arylidene, the parent compound is 2H-imidazole and when the substituent in the 4-position is an oxo-arylidene, the parent compound is 4H-imidazole. It will be noted that "cyclohexadienylidene" is used in this specification as it is commonly employed as the name for (XH)-phenylidene.

2H- AND 4H-IMIDAZOLES SUBSTITUENTS IN POSITIONS AS SHOWN

| 2-Position | 4-Position | 5-Position |
|---|---|---|
| 2-oxo-1(2H)-anthrylidene | Phenyl | Phenyl. |
| 3-oxo-2(3H)-anthrylidene | do | Do. |
| 10-oxo-9(10H)-anthrylidene | do | Do. |
| 2-oxo-3,5-cyclohexadienylidene | p-Chlorophenyl | p-Chlorophenyl. |
| Do | 9-Phenanthryl | 9-Phenanthryl. |
| Do | Phenyl | Phenyl. |
| 2-oxo-3,5-dibromo-3,5-cyclohexadienylidene | do | Do. |
| 2-oxo-3,5-difluoro-3,5-cyclohexadienylidene | do | Do. |
| 4-oxo-2,5-cyclohexadienylidene | 9-anthryl | 9-anthryl. |
| Do | p-Benzoylphenyl | p-Benzoylphenyl. |
| Do | o-Benzylthiophenyl | Phenyl. |
| Do | p-Benzylthiophenyl | Do. |
| Do | 4-biphenylyl | 4-biphenylyl. |
| Do | m-Bromophenyl | Phenyl. |
| Do | m-Butoxyphenyl | m-Butoxylphenyl. |
| Do | p-Butylthiophenyl | Phenyl. |
| Do | m-Butyrylphenyl | Do. |
| Do | p-Chlorophenyl | p-Chlorophenyl. |
| Do | o-Cyanophenyl | Phenyl. |
| Do | p-Dibutylaminophenyl | Do. |
| Do | p-Dimethylaminophenyl | p-Benzylthiophenyl. |
| Do | do | p-Dimethylaminophenyl. |
| Do | do | Phenyl. |
| Do | m-Ethoxycarbonylphenyl | m-Ethoxycarbonylphenyl. |
| Do | p-Ethylphenyl | Phenyl. |
| Do | m-Fluorophenyl | m-Fluorophenyl. |
| Do | p-Hydroxyphenyl | p-Benzylthiophenyl. |
| Do | do | p-Dimethylaminophenyl. |
| Do | do | p-Hydroxyphenyl. |
| Do | do | Phenyl. |
| Do | o-Iodophenyl | o-Iodophenyl. |
| Do | p-Isobutylphenyl | p-Isobutylphenyl. |
| Do | o-Methoxyphenyl | o-Methoxyphenyl. |
| Do | p-Methoxyphenyl | p-Benzylthiophenyl. |
| Do | do | p-Dimethylaminophenyl. |
| Do | do | p-Methoxyphenyl. |
| Do | do | Phenyl. |
| Do | p-Methylsulfonylphenyl | p-Methylsulfonylphenyl. |
| Do | 1-naphthyl | 1-naphthyl. |
| Do | m-(1-naphthyl)-phenyl | m-(1-naphthyl)-phenyl. |
| Do | 2-naphthyl | 2-naphthyl. |
| Do | 9-phenanthryl | 9-phenanthryl. |
| Do | p-Phenoxycarbonylphenyl | p-Phenoxycarbonylphenyl. |
| Do | p-Phenoxyphenyl | p-Phenoxyphenyl. |
| Do | Phenyl | Phenyl. |
| Do | m-Phenylsulfonylphenyl | m-Phenylsulfonylphenyl. |
| Do | o-Propionylphenyl | o-Propionylphenyl. |
| Do | o-Propylphenyl | o-propylphenyl. |
| Do | m-Tolyl | M-Tolyl. |
| 4-oxo-3-benzoyl-2,5-cyclohexadienylidene | Phenyl | Phenyl. |
| 4-oxo-3,5-dibromo-2,5-cyclohexadienylidene | do | Do. |
| 4-oxo-3,5-di-t-butyl-2,5-cyclohexadienylidene | do | Do. |
| 4-oxo-3,5-dichloro-2,5-cyclohexadienylidene | do | Do. |
| 4-oxo-3,5-dicyano-2,5-cyclohexadienylidene | do | Do. |
| 4-oxo-3,5-dimethoxy-2,5-cyclohexadienylidene | p-Benzylthiophenyl | p-Benzylthiophenyl. |
| Do | do | p-Methoxyphenyl. |
| Do | do | Phenyl. |
| Do | p-Dimethylaminophenyl | p-Dimethylaminophenyl. |
| Do | do | Phenyl. |
| Do | p-Methoxyphenyl | p-Methoxyphenyl. |
| Do | Phenyl | Phenyl. |
| Do | p-Phenylsulfonylphenyl | p-Phenylsulfonylphenyl. |

2H- AND 4H-IMIDAZOLES SUBSTITUENTS IN POSITIONS AS SHOWN—Continued

| 2-Position | 4-Position | 5-Position |
| --- | --- | --- |
| 4-oxo-2-methoxy-2,5-cyclohexadienylidene | Phenyl | Phenyl. |
| 4-oxo-3,5-dimethyl-2,5-cyclohexadienylidene | do | Do. |
| 2-oxo-1(2H)-naphthylidene | do | Do. |
| 2-oxo-7,8-dibromo-1(2H)-naphthylidene | do | Do. |
| 4-oxo-1(4H)-naphthylidene | do | Do. |
| 5-oxo-1(5H)-naphthylidene | do | Do. |
| 7-oxo-1(7H)-naphthylidene | do | Do. |
| 1-oxo-2(1H)-naphthylidene | do | Do. |
| 3-oxo-2(3H)-naphthylidene | do | Do. |
| 6-oxo-2(6H)-naphthylidene | do | Do. |
| 8-oxo-2(8H)-naphthylidene | do | Do. |
| 8-oxo-1,4-dimethyl-2(8H)-naphthylidene | do | Do. |
| 1-oxo-2(1H)-phenanthrylidene | do | Do. |
| 2-oxo-1(2H)-phenanthrylidene | do | Do. |
| 9-oxo-10(9H)-phenanthrylidene | do | Do. |
| p-Benzylthiophenyl | 4-oxo-2,5-cyclohexadienylidene | p-Benzylthiophenyl. |
| Do | do | p-Dimethylaminophenyl. |
| Do | do | p-Hydroxyphenyl. |
| Do | do | p-Methoxyphenyl. |
| Do | do | Phenyl. |
| p-Dimethylaminophenyl | do | p-Dimethylaminophenyl. |
| Do | do | p-Hydroxyphenyl. |
| Do | do | p-Methoxyphenyl. |
| Do | do | Phenyl. |
| p-Ethylphenyl | 4-oxo-2,5-cyclohexadienylidene | p-Ethylphenyl. |
| Do | 4-oxo-3,5-dibromo-2,5-cyclohexadienylidene. | Do. |
| Do | 4-oxo-3-methyl-2,5-cyclohexadienylidene. | Do. |
| p-Hydroxyphenyl | 4-oxo-2,5-cyclohexadienylidene | p-Methoxyphenyl. |
| p-Methoxyphenyl | do | p-Benzylthiophenyl. |
| Do | do | p-Dimethylaminophenyl. |
| Do | do | p-Hydroxyphenyl. |
| Do | do | p-Methoxyphenyl. |
| Do | do | Phenyl. |
| Phenyl | 2-oxo-1(2H)-anthrylidene | p-Iodophenyl. |
| Do | 10-oxo-9(10H)-anthrylidene | Phenol. |
| Do | 4-oxo-2,5-cyclohexadienylidene | p-Benzylthiophenyl. |
| Do | do | p-Chlorophenyl. |
| Do | do | p-Dimethylaminophenyl. |
| Do | do | p-Hydroxyphenyl. |
| Do | do | p-Methoxyphenyl. |
| Do | do | Phenyl. |
| Do | 2-oxo-1(2H)-naphthylidene | Do. |
| Do | 3-oxo-7,8-dibutyl-2(3H)-naphthylidene. | Do. |
| Do | 3-oxo-2(3H)-naphthylidene | Do. |
| 4-oxo-2,5-cyclohexadienylidene | Hydrogen | Hydrogen. |
| Do | Methyl | Methyl. |
| 4-oxo-3,5-dimethoxy-2,5-cyclohexadienylidene | do | Do. |
| Hydrogen | 4-oxo-2,5-cyclohexadienylidene | p-Hydroxyphenyl. |
| 4-oxo-3,5-dimethoxy-2,5-cyclohexadienylidene | p-Trimethylammoniophenylmethylsulfate. | Phenyl. |
| Do | do | p-Trimethylammoniophenylmethylsulfate. |
| 4-oxo-2,5-cyclohexadienylidene | Hydrogen | Phenyl. |
| Do | Ethyl | Tolyl. |
| Do | p-Trifluoromethylphenyl | p-Trifluoromethylphenyl. |
| Do | 2-cyanoethyl | 2-cyanoethyl. |
| Do | Trifluoromethyl | Trifluoromethyl. |
| Do | Methoxymethyl | Methoxymethyl. |

In the above table, there are described oxoarylidene imidazoles having hydroxyaryl substituents. While these are represented in the table as the hydroxyaryl compounds, it will be recognized that these may also exist in tautomeric forms wherein the hydroxyl hydrogen has tautomerized to a nitrogen of the imidazole ring. It will also be noted that in Example 16, there is disclosed the preparation of 4,5 - bis(hydroxyphenyl)imidazole. This compound may also exist in the tautomeric form wherein the hydroxylic hydrogen has tautomerized to a nitrogen of the imidozle ring thereby creating another 4-oxo-2,5-cyclodienylidene ring.

Such hydroxy aryl compounds, in having tautomerizable phenolic hydrogens, are salt-forming compounds. For example, in alkali, the hydroxy phenol may exist as phenoxide ion, its conjugate base, i.e. —C₆H₄O⁻ wherein the substituent group is on the phenyl radical, is now the oxide ion —O⁻ having a Hammett sigma value of —1.0. As for the conjugate bases of hydroxy aryl compounds in general, the conjugate bases of the hydroxy phenyl containing oxo-arylidene imidazoles may be indicated as resonance hybrids of a multiplicity of canonical forms among which is the conjugate base of the imidazole tautomer discussed above corresponding to the hydroxy aryl compound. In other words, both the hydroxy aryl compound and its tautomer may give rise to the same conjugate base on reaction with alkali.

As representative examples of complete formulas and names of the foregoing invention imidazoles, the following are given:

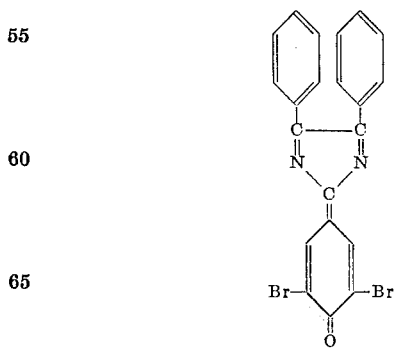

2 - (4 - oxo - 3,5 - dibromo - 2,5 - cyclohexadienylidene)-4,5-diphenyl 2H-imidazole.

The oxo-arylidene-imidazoles are conveniently prepared by oxidation of the corresponding dihydro derivatives.

These precursors are generally regarded as having the structure:

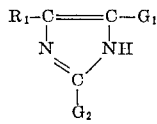

may be obtained by reaction of a 1,2-dicarbonyl compound ($G_1COCOR_1$), monoaldehyde ($G_2CHO$) and a suitable source of ammonia, according to the general procedures described by Davidson, et al., J. Org. Chem. 2, 319 (1937) (using ammonium acetate in acetic acid) and in Belgian Pat. 589,417 (using formamide at elevated temperatures as the ammonia source). In the above scheme, one of $G_1$ and $G_2$ corresponds to HA (a hydroxyaryl radical), the other to $R_2$, with $R_1$ and $R_2$ and A having the significance described earlier. In other words, either the dicarbonyl or the aldehyde may contain a hydroxyaryl group whose hydroxyl is positioned for conjugation with the carbonyl group in the reactant and with the imidazole ring in the product. For example, a hydroxyaromatic aldehyde such as 2-(or 4-)hydroxybenzaldehyde or 2-(or 4-, 5-, or 7-)hydroxy-1-naphthaldehyde, 2-(or 4-, 5-, 7-, or 10-)hydroxy-9-anthraldehyde, 2-(or 4-, 6-, 8-, or 9-)hydroxy-1-phenanthraldehyde is employed in conjunction with a dicarbonyl compound such as glyoxal, biacetyl, phenylglyoxal, benzil, and the like; or, a hydroxyaryl dicarbonyl such as hydroxybenzil or dihydroxybenzil is employed with an aliphatic or aromatic aldehyde such as formaldehyde, acetaldehyde and homologs, benzaldehyde, naphthaldehyde, etc. Either the dicarbonyl compound or the monoaldehyde or both may be substituted with appropriate groups as discussed above.

Alternately, acyloin, such as benzoin or an hydroxybenzoin, may be employed in place of the dicarbonyl compound. Heating such acyloin with a suitable monoaldehyde as above in the presence of cupric acetate and ammonia in a solvent such as methanol results in the formation of precursor; apparently, the acyloin is converted in situ to the corresponding dicarbonyl compound by the action of the cupric acetate.

The precursors (dihydro compounds) are readily dehydrogenated (oxidized), under a variety of oxidizing conditions, to the oxo-arylidene-imidazoles, as described in the examples. Such transformation of precursor to colored body may also be effected photochemically in the presence of a suitable initiator such as 2,2'-bis(2-chlorophenyl)-4,4',5,5'-tetraphenylbiimidazole. This has particular utility; for example, dyeings are obtained when the ultraviolet light is impinged upon, say, paper impregnated with a mixture of a selected precursor and initiator as more fully described in the representative examples.

It is understood that the over-all process may be operated without isolating the intermediate precursor.

Representative examples illustrating the present invention follow. The parts of materials are in parts by weight.

*Example 1*

A mixture of 10.5 parts of benzil, 6.1 parts of p-hydroxybenzaldehyde, 30 parts of ammonium acetate, and 262 parts of glacial acetic acid was refluxed for two hours, cooled to room temperature, and added with stirring to 3000 parts of water. The precipitated solid was collected by filtration, washed with water, and vacuum dried. The product, presumed to be 2-(p-hydroxyphenyl)4,5-diphenylimidazole, melted at 260°–261° C.

One part of the material prepared above was mechanically shaken with 132 parts of benzene and five parts of lead dioxide for two and one-quarter hours. The mixture was filtered. The filtrate was concentrated in vacuo to yield 0.6 part of a red-brown solid, which after recrystallization from heptane, had a melting range of 290° to 300° C. Analysis confirmed the identity of the product as 2-(4-oxo-2,5-cyclohexadienylidene)-4,5-diphenyl-2H-imidazole.

*Analysis.*—Calculated for $C_{21}H_{14}N_2O$: percent C=81.3; percent H=4.5; percent N=9.0. Found: percent C=81.1; percent H=4.8; percent N=9.0.

Image formation on, or coloring of paper by means of the above oxo-cyclohexadienylidenediphenylimidazole being produced photochemically is illustrated as follows. In a mixture of 430 parts of benzene and 461 parts of dimethylformamide is dissolved 16.5 parts of 2,2'-bis(o-chlorophenyl)-4,4',5,5'-tetraphenylbiimidazole. The resultant solution is applied to No. 1 filter paper at the rate of 13.7 ml. per square foot. The paper is dried for 0.5 hour at room temperature. When irradiated for five seconds with light from an ultraviolet lamp, the paper is colored yellow by the formation of 2-(4-oxo-2,5-cyclohexadienylidene)-4,5-diphenyl-2H-imidazole.

*Example 2*

4-hydroxy-3,5-dibromobenzaldehyde was prepared by the method of Lindemann, Ann. 431, 220 (1923) and converted to 2-(4-hydroxy-3,5-dibromophenyl)-4,5-diphenylimidazole by heating 14.0 parts of the hydroxydibromobenzaldehyde with 10.5 parts benzil and 30.0 parts ammonium acetate in a refluxing acetic acid solution containing 262 parts of glacial acetic acid. The imidazole, recrystallized successively from aqueous ethanol and xylene solutions, melted at 233° C. By oxidation as in Example 1 of one part of this imidazole with lead oxide, 0.3 part of 2-(4-oxo-3,5-dibromo-2,5-cyclohexadienylidene)-4,5-diphenyl-2H-imidazole was obtained. The crystalline dark red-brown product, solvated with benzene and water, analyzed as follows: Calculated for $C_{21}H_{12}Br_2N_2O \cdot 1/3 C_6H_6 \cdot 2H_2O$, percent C=52.1; percent H=3.4; percent N=5.3; percent Br=30.1. Found: percent C=52.8; percent H=3.3; percent N=5.4; percent Br=29.6.

When paper is impregnated as described in Example 1 employing 5.9 parts of 2-(4-hydroxy-3,5-dibromophenyl)-4,5-diphenylimidazole in place of the 2-(4-hydroxyphenyl)-4,5-diphenylimidazole and illuminated with UV light orange color appears on the irradiated areas. The orange color results from the formation of 2-(4-oxo-3,5-dibromo-2,5-cyclohexadienylidene)-4,5-diphenyl-2H-imidazole.

*Example 3*

4-hydroxy-3,5-dichlorobenzaldehyde was prepared by the procedure given in Ber. 37, 4031 and converted to 2-(4-hydroxy-3,5-dichlorophenyl)-4,5-diphenylimidazole by reaction of 8.7 parts of the hydroxydichlorobenzaldehyde with 9.6 parts of benzil and 27 parts of ammonium acetate in refluxing glacial acetic acid solution as in Example 1. The crystalline product melted at 235.0 to 235.5° C. Upon oxidation with lead dioxide as described in Example 1, 1 part of the imidazole yielded 0.6 part of reddish purple crystals having a melting range of 245° to 246° C. Identity by analysis of the oxidation product as 2-(4-oxo-3,5-dichloro-2,5-cyclohexadienylidene)-4,5-diphenyl-2H-imidazole was confirmed as follows. Calculated for $C_{21}H_{12}Cl_2N_2O$: percent C=66.5; percent H=3.2; percent N=7.4; percent Cl=18.7. Found: percent C=66.7; percent H=3.1; percent N=7.0; percent Cl=18.2.

*Example 4*

4-hydroxy-3,5-dimethylbenzaldehyde was prepared by the procedure of Thiele et al., Ann 311, 366 (1900) and converted to 2-(4-hydroxy-3,5-dimethylphenyl)-4,5-diphenyl-imidazole by refluxing as described in Example 1 the following mixture:

| | Parts |
|---|---|
| 4-hydroxy-3,5-dimethylbenzaldehyde | 4.0 |
| Benzil | 5.6 |
| Ammonium acetate | 20 |
| Glacial acetic acid | 157 |

The imidazole product, recrystallized from aqueous ethanol solution, melted at 263° to 264°. One part of the imidazole was oxidized with lead dioxide to 0.4 part of 2-(4-oxo-3,5-dimethyl-2,5-cyclohexadienylidene)-4,5-diphenyl-2H-imidazole, a purple crystalline material having the following analysis: Calculated for $C_{23}H_{18}N_2O$: percent C=81.6; percent H=5.4; percent N=8.3. Found: percent C=81.9; percent H=5.4; percent N=8.5.

*Example 5*

Commercial syringaldehyde was converted to 2-(4-hydroxy-3,5-dimethoxyphenyl)-4,5-diphenylimidazole by refluxing the following mixture:

| | Parts |
|---|---|
| 4-hydroxy-3,5-dimethoxybenzaldehyde | 5.0 |
| Benzil | 5.8 |
| Ammonium acetate | 20 |
| Glacial acetic acid | 157 |

The imidazole product melted at 290°–292° C. One part oxidized with lead dioxide as in the preceding examples yielded 0.3 part of a purple crystalline product which was 2-(4-oxo-3,5-dimethoxy-2,5-cyclohexadienylidene)-4,5-diphenyl-2H-imidazole, identified by analysis after recrystallization from a benzene-heptane mixture as follows: Calculated for: $C_{23}H_{18}N_2O_3$: percent C=74.6; percent H=4.9; percent N=7.6. Found: percent C=74.8; precent H=4.9; percent N=7.5.

*Example 6*

A reaction mass consisting of

| | Parts |
|---|---|
| Syringaldehyde | 5.6 |
| p-Anisil | 8.2 |
| Ammonium acetate | 22 |
| Glacial acetic acid | 173 | was converted to 2-(4-hydroxy-3,5-dimethoxyphenyl)-4,5-bis(p-methoxyphenyl)imidazole by the procedure of Example 1. One part of the resultant imidazole was oxidized with lead dioxide to provide a greenish black 2-(4-oxo-3,5-dimethoxy - 2,5 - cyclohexadienylidene) - 4,5 - bis(p-methoxyphenyl)-2H-imidazole having a melting range of 224° to 227° C. and solvated with benzene and water. Analysis was as follows: Calculated for $$C_{25}H_{22}N_2O_5 \cdot 5/6 C_6H_6 \cdot H_2O$$

percent C=70.2; percent H=5.7; percent N=5.5. Found: percent C=70.2; percent H=5.8; percent N=5.6.

This product can be used in benzene solution to dye paper red-violet.

*Example 7*

4-hydroxy-3,5-di-t-butylbenzaldehyde prepared according to the method described in J. Org. Chem. 22, 1333 (1957) was converted to 2-(4-hydroxy-3,5-di-t-butylphenyl)-4,5-diphenylimidazole by the procedure of Example 1 employing the following reactants:

| | Parts |
|---|---|
| 4-hydroxy-3,5-di-t-butylbenzaldehyde | 7.0 |
| Benzil | 6.3 |
| Ammonium acetate | 20 |
| Glacial acetic acid | 157 |

The imidazole was oxidized with lead dioxide to give a quantitative yield of red-brown 2-(4-oxo-3,5-di-t-butyl-2,5-cyclohexadienylidene)-4,5-diphenyl-2H-imidazole having a melting range of 203° to 206° C. and an identifying analysis as follows: Calculated for $C_{29}H_{30}N_2O$: Percent C=82.4; percent H=7.2. Found: Percent C=81.9; percent H=7.4.

This product can be used in benzene solution to dye paper orange.

*Example 8*

3,5-dibromosalicylaldehyde, prepared as described in Ann. 435, 223, was converted to 2-(2-hydroxy-3,5-dibromophenyl)-4,5-diphenylimidazole by the procedure of Example 1 employing the following reactants:

| | Parts |
|---|---|
| 3,5-dibromosalicylaldehyde | 5.0 |
| Benzil | 3.8 |
| Ammonium acetate | 15 |
| Glacial acetic acid | 131 |

One part of the above imidazole was oxidized with lead dioxide to give 0.4 part of a crystalline orange compound, 2 - (2 - oxo-3,5-dibromo-3,5-cyclohexadienylidene)-4,5-diphenyl-2H-imidazole, solvated with benzene and identified by the following analysis: Calculated for $C_{21}H_{12}Br_2N_2O \cdot 5/6 C_6H_6$: Percent C=58.6; percent H= 3.2; percent N=5.3; percent Br=30.0. Found: Percent C=59.0; percent H=3.1; percent N=5.7; percent Br= 27.4.

This product can be used to dye paper orange.

*Example 9*

4-hydroxybenzil was prepared as described in J. Org. Chem. 24, 516, and reacted in the following mixture:

| | Parts |
|---|---|
| Benzaldehyde | 1.1 |
| 4-hydroxybenzil | 1.8 |
| Ammonium acetate | 6.0 |
| Glacial acetic acid | 52 | to provide 4-(4-hydroxyphenyl)-2,5-diphenylimidazole having a melting range of 121 to 124° C. Upon oxidation with lead dioxide 4-(4-oxo-2,5-cyclohexadienylidene)-2,5-diphenyl-4H-imidazole was obtained. This product can be used to dye paper orange-red.

*Example 10*

From

| | Parts |
|---|---|
| 2-hydroxy-1-naphthaldehyde | 2.0 |
| Benzil | 2.4 |
| Ammonium acetate | 7.0 |
| And glacial acetic acid | 63 | by the procedure of Example 1, 2-(2-hydroxyl-1-naphthyl)-4,5-diphenylimidazole was prepared. It had a melting range of 199° to 201° C. When oxidized with lead oxide the imidazole formed 2-[2-oxo-1(2H)-naphthylidene-]4,5-diphenyl-2H-imidazole.

This product can be used to dye paper orange.

*Example 11*

4,4'-bis(benzylthio)benzoin, prepared from 4-benzylthiobenzaldehyde by the general benzoin condensation procedure described in "Organic Reactions," vol. IV, John Wiley and Sons, Inc., New York (1948), p. 279, was oxidized to the corresponding 4,4'-bis(benzylthio)-benzil by the method of Weiss et al., J. Am. Chem. Soc., 70, 3666 (1948). The latter benzil was converted to 2 (4-hydroxy-3,5-dimethoxyphenyl)-4,5-bis-(p-benzylthiophenyl)imidazole by refluxing as described in Example 1 the following mixture:

| | Parts |
|---|---|
| Syringealdehyde | 3.2 |
| 4,4'-bis-benzylthiobenzil | 7.9 |
| Ammonium acetate | 12.1 |
| Glacial acetic acid | 50.0 |

The imidazole, recrystallized from a benzenemethanol mixture, had a melting point of 215.5–217° C. and analyzed as follows: Calculated for $C_{37}H_{32}O_3N_2S_2$: Percent C=72.0, percent H=5.2, percent N=4.5, percent S=10.4. Found: Percent C=72.3, percent H=5.1, percent N=4.5, percent S=10.3.

One part of the imidazole was oxidized with 5 parts of lead dioxide in 132 parts of benzene to afford 0.8 part of 2 - (4 - oxo - 3,5-dimethoxy-2,5-cyclohexadienylidene)-4,5-bis(p-benzylthiophenyl)-2H-imidazole, a greenish-brown crystalline material melting at 218–220° C. and having the following analysis: Calculated for $C_{37}H_{30}O_3S_2N_2$: Percent C=72.3, percent H=4.9, percent N=4.5, percent S=10.4. Found: Percent C=73., percent H=4.9, percent N=4.3, percent S=9.9.

This product can be used in acetone or benzene solution to dye paper purple. The dyed paper functions as pH indicator changing color from purple through blue to green with progressively decreasing pH. The initial purple color is restored upon increasing the pH.

*Example 12*

4-dimethylaminobenzil was prepared by the method of Staudinger, Ber. 46, 3537 (1913) and converted to 2-(4-hydroxy-3,5-dimethoxyphenyl)-4-(p-dimethylaminophenyl)-5-phenylimidazole by refluxing as described in Example 1 the following mixture:

|  | Parts |
|---|---|
| Syringealdehyde | 12.9 |
| 4-dimethylaminobenzil | 11.6 |
| Ammonium acetate | 31.0 |
| Glacial acetic acid | 200.0 |

The imidazole, recrystallized from a benzenemethanol mixture, melted at 165–167° C. and analyzed as follows: Calculated for $C_{25}H_{25}O_3N_3$: Percent C=72.3, percent H=6.1, percent N=10.1. Found: Percent C=72.7, percent H=6.0, percent N=10.1.

One and one-half parts of the imidazole was oxidized with 7.5 parts lead dioxide in 200 parts benzene to afford 1.15 parts of 2 - (4 - oxo-3,5-dimethoxy-2,5-cyclohexadienylidene) - 4 - (p-dimethylaminophenyl)-5-phenyl-2H-imidazole melting at 180–181° C. and having the following analysis: Calculated for $C_{26}H_{23}O_3N_3 \cdot 1/2 C_6H_6$: Percent C=74.3, percent H=5.7, percent N=9.3. Found: Percent C=74.2, percent H=5.6, percent N=8.8.

This product, a green-black crystalline material, can be used in benzene or acetone solution to dye paper green. The colored paper is pH-sensitive acquiring either violet or green color depending on whether it is exposed to acidic or slightly basic environment, respectively.

*Example 13*

4,4'-bis-dimethylaminobenzil was prepared by the method of Staudinger, Ber. 42, 3493 (1909) and converted to 2-(4-hydroxy-3,5-dimethoxyphenyl)-4,5-bis(p-dimethylaminophenyl) imidazole by refluxing as described in Example 1 the following mixture:

|  | Parts |
|---|---|
| Syringealdehyde | 21.6 |
| Bis(dimethylamino)benzil | 35.4 |
| Ammonium acetate | 81.6 |
| Glacial acetic acid | 330.0 |

The imidazole product, recrystallized from methanol-benzene mixtures, had a melting point of 262–263° C. and the following analysis: Calculated for $C_{27}H_{30}O_3N_4$: Percent C=70.7, percent H=6.6, percent N=12.2. Found: Percent C=71.7, percent H=6.5, percent N=12.0.

Oxidation of 2.2 parts of the above imidazole with 11.0 parts lead dioxide in 264 parts benzene afforded 1.3 parts of 2-(4-oxo-3,5-dimethoxy-2,5-cyclohexadienylidene) - 4,5-bis(p-dimethylaminophenyl) - 2H-imidazole melting at 229–230° C. and having the following analysis: Calculated for $C_{27}H_{28}O_3N_4 \cdot C_6H_6$: Percent C=74.0; percent H=6.3, percent N=10.5. Found: Percent C=73.7; percent H=6.0; percent N=10.9.

This product, a dark brown crystalline material, can be used in a benzene or acetone solution to dye paper blue. The colored paper turns purple and eventually white with decreasing pH. The initial blue color is restored upon increasing the pH.

*Example 14*

To an ice-cold solution of 12.2 parts of p-hydroxybenzaldehyde in 28.3 parts of concentrated aqueous ammonium hydroxide (30%) was added dropwise, with stirring and cooling, 19.4 parts 30% aqueous glyoxal solution. The addition was completed in about 30 minutes and the mixture, in which a yellowish solid had appeared, was warmed to and allowed to remain at room temperature for a few hours. The product was isolated by suction filtration, washed several times with cold water and air-dried. After recrystallization from dimethylformamide, the slightly yellow crystalline 2-(4-hydroxyphenyl)imidazole had a melting point of 267–270° (with some darkening at 250°).

Oxidation of the above imidazole in dimethylformamide solution by an equimolar quantity of n-bromosuccinimide (or by lead dioxide as in the procedure of Example 1), produced a red-brown solution containing 2 - (4-oxo-2,5-cyclohexadienylidene)-2H-imidazole. The solution dyes paper light brown.

*Example 15*

2,3-butanedione was converted to 2-(4-hydroxy-3,5-dimethoxyphenyl)4,5-dimethylimidazole by the method of preparation in Example 1 from the following mixture:

|  | Parts |
|---|---|
| Syringe aldehyde | 5.0 |
| 2,3-butanedione | 2.4 |
| Ammonium acetate | 19.1 |
| Glacial acetic acid | 12.0 |

The imidazole, recrystallized from a benzene-methanol mixture, had a melting point of 266–267°. Oxidation with n-bromosuccinimide in dimethylforamide produces an orange-red solution of the 4-oxo-3,5-dimethoxy-2,5-cyclohexadienylidene-4,5-dimethylimidazole which dyes paper orange.

*Example 16*

4,5-bis(hydroxyphenyl)imidazole was prepared from the following mixture by the method of Example 1:

|  | Parts |
|---|---|
| 4,4'-dihydroxybenzil | 3.1 |
| Paraformaldehyde | 1.0 |
| Ammonium acetate | 8.9 |
| Glacial acetic acid | 40.0 |

The imidazole, a light yellow solid, did not melt until after 300° with extensive darkening. When dissolved in dimethylformamide and oxidized with n-bromosuccinimide, the above imidazole produced a dark brown solution of 4(4 - oxo-2,5-cyclohexadienylidene)-5-phenyl-4H-imidazole which dyes paper brown-black.

*Example 17*

To a solution of 1.3 parts of 2-(3,5-dimethoxy-4-hydroxyphenyl)-4,5-bis-(4-dimethylaminophenyl) imidazole of Example 13 in 60 parts of methylethyl ketone was added 0.5 part dimethylsulfate. The mixture was refluxed for about 30 minutes during which a white solid separated. The salt (bis-quaternary ammonium methyl sulfate salt) was collected by filtration, dried and recrystallized twice from methanol-benzene.

Oxidation of the above bis-quaternary ammonium compound with n-bromosuccinimide in dimethylformamide produced a deep red solution of 2-(4-oxo-3,5-dimethoxy - 2,5 - cyclohexadienylidene)-4,5-(bis-trimethylammonia phenyl)-2H-imidazole bis(methylsulfate) which dyes paper orange-red.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive privilege or property is claimed are defined as follows:

1. An oxo-arylideneimidazole having the formula

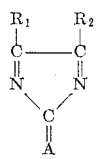

said radicals A and $R_1$ are interchangeable to give the corresponding oxo-arylideneimidazole; A is X-oxo (XH) arylidene of from 6 to 14 nuclear carbon atoms, said X designating a position in the arylidene such that the oxo atom is conjugated with said imidazole group; $R_1$ and $R_2$ are taken from the group consisting of hydrogen, alkyl of up to 18 carbon atoms and aryl radicals of up to 18 carbon atoms; at least one hydrogen of said imidazole may be replaced by a substituent having a Hammett sigma value of from —1.0 to 1.0.

2. An oxo-arylideneimidazole according to claim 1 wherein said Hammett sigma value is from —0.60 to 0.90.

3. An oxo-arylideneimidazole according to claim 1 where said A is a radical taken from the group consisting of 2-oxo-(2-H)-phenylidene, 4-oxo-(4-H)-phenylidene, 2-oxo-(2-H)-naphthylidene, 4-oxo-(4-H)-naphthylidene, and said radicals substituted with substituents having a Hammett sigma value of from —0.4 to 0.4.

4. An oxo-arylidene-imidazole of the formula

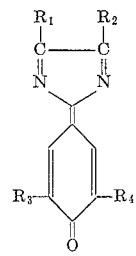

wherein $R_3$ and $R_4$ are taken from the group consisting of hydrogen, halogen, lower alkyl and lower alkoxyl; wherein $R_1$ and $R_2$ are taken from the group consisting of hydrogen, alkyl of up to 18 carbon atoms and aryl radicals of up to 18 carbon atoms, and wherein at least one hydrogen of said alkyl and aryl radicals may be replaced by a substituent other than hydrogen having a Hammett sigma value of from —1.0 to 1.0.

5. An oxo-arylidene-imidazole according to claim 4 wherein said Hammett sigma value is from —0.60 to 0.90.

6. An oxo-arylidene-imidazole according to claim 4 wherein $R_1$ and $R_2$ are hydrogen atoms.

7. An oxo-arylidene-imidazole according to claim 4 wherein $R_1$ and $R_2$ are methyl radicals.

8. An oxo-arylidene-imidazole according to claim 4 wherein $R_1$ and $R_2$ are phenyl radicals.

9. An oxo-arylidene-imidazole according to claim 4 wherein $R_1$ and $R_2$ are substituted phenyl radicals, said substituents having Hammett sigma values of from —1.0 to 1.0.

No references cited.

WALTER A. MODANCE, *Primary Examiner.*

N. TROUSOF, *Assistant Examiner.*